United States Patent [19]

Horton

[11] Patent Number: 4,503,077

[45] Date of Patent: Mar. 5, 1985

[54] METHOD FOR PRESERVING FISHING BAIT

[76] Inventor: Truman V. Horton, Rte. 2, Box 234, Ruston, La. 71270

[21] Appl. No.: 460,146

[22] Filed: Jan. 24, 1983

[51] Int. Cl.³ .................................................. A23K 3/00
[52] U.S. Cl. ....................................... 426/1; 426/385; 426/805; 119/3
[58] Field of Search ............... 426/1, 385, 805; 119/1, 119/15, 3

[56] References Cited

U.S. PATENT DOCUMENTS

| | | | |
|---|---|---|---|
| 3,361,566 | 1/1968 | Axelrod | 426/104 X |
| 3,528,816 | 9/1970 | Nagae | 426/1 X |
| 3,719,496 | 3/1973 | Chen et al. | 426/385 |
| 3,846,557 | 11/1974 | Mulla et al. | 426/385 |
| 4,053,640 | 10/1977 | Takasugi | 426/385 X |
| 4,187,946 | 2/1980 | Stevenson | 119/15 X |
| 4,192,254 | 3/1980 | Apel | 119/15 X |

*Primary Examiner*—R. B. Penland
*Attorney, Agent, or Firm*—John M. Harrison

[57] ABSTRACT

A method for preserving fishing bait, including worms, crickets, shrimp, crawfish, grasshoppers, frogs, minnows and other live bait organisms, which includes the steps of cleaning the bait organisms where such cleaning is necessary, pre-cooling the organisms where such pre-cooling is necessary, and subjecting the organisms to a freezing, condensing, evacuating and heating environment to remove water, and then separating and packaging the bait organisms. The freezing step is accomplished at a temperature below the eutectic of the selected of the bait organisms, and placing of the processed bait organisms in water restores the life-like appearance and odor of the organisms.

3 Claims, 1 Drawing Figure

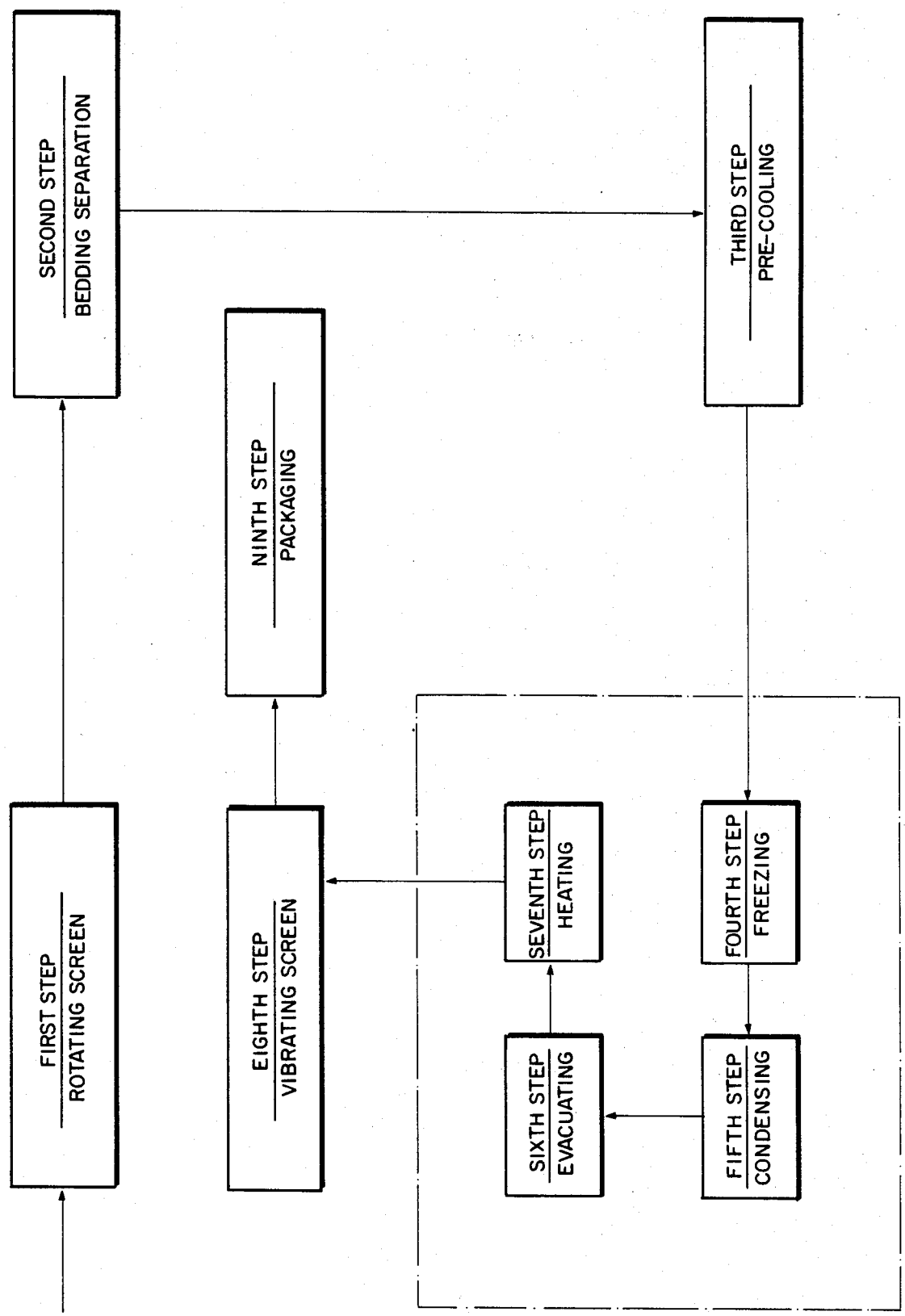

METHOD FOR PRESERVING FISHING BAIT

BACKGROUND OF THE INVENTION

1. Field of the Invention

This invention relates to fishing bait, and more particularly, to live fishing bait organisms which are preserved by a process of cleaning, freeze drying, separating and packaging under certain conditions of temperature and application of vacuum, to preserve the nutrient constituency and the cellular integrity of the bait organisms. The organisms are packaged and stored without deterioration by bacteria, and can be restored by application of water to a life-like appearance and freshness which are attractive to feeding fish. It has been found that virtually any live bait organism can be effectively processed according to the method of this invention, including worms, crickets, shrimp, crawfish, grasshoppers, frogs and minnows, in non-exclusive particular. The time required for reconstitution of the processed bait organism is about 4 to 8 minutes, depending upon the specific organism chosen. Since the process has been carefully tailored to remove only water from bait organisms, all of the natural nutrients and tissue materials remain intact, and when water re-enters the tissues, the resulting organism closely resembles the original bait in appearance and odor.

2. Description of the Prior Art

The preservation of fishing bait by freeze drying and dehydration techniques has been known in the prior art for several years. U.S. Pat. No. 3,361,566 to H. R. Axelrod, discloses a "Freeze Dried Food Article for Aquatic Animals", which article is composed primarily of the freeze dried, high protein materials, including earth worms. The patented food article was developed primarily for aquarium use and is initially washed and freeze dried in shallow containers, after which the food is warmed to room temperature. The material is then separated into small pieces and may be coated with an adhesive for attachment to the aquarium wall. U.S. Pat. No. 3,528,816, to Shoichi Nagae, discloses a "Fish Bait With a Fish-Hook" which includes in one embodiment, placing the live bait on a fish hook and freezing the hook and bait to a temperature of about minus 25 degrees centigrade. The frozen bait is then kept in a vacuum desiccator for a certain period of time and is subsequently heated and packaged. The earth worm is restored by placing it in water and the combination is then ready for fishing since the worm is already placed on the hook.

U.S. Pat. No. 3,719,496, to Chen, et al., discloses "Articles of White Food for Feeding Aquatic Animals and Method of Manufacture" This patent details a high protein content food for fishes and like aquatic animals which is prepared by dehydrating selected worms, quickly freezing a mass of the dehydrated worms and then freeze drying the mass. U.S. Pat. No. 4,053,640, to Tadashi Takasugi, discloses a fishing bait and method of making same, which includes a fish bait, including raw fish, which has been ground and pulverized and blended with a surface active agent and subsequently freeze dried. The bait is again pulverized after the freeze drying process and is then placed in a water permeable, sealable container. When placed in the water the bait thus manufactured allows the taste and smell to be dispersed throughout the water and attacts the fish.

One of the problems realized in the prior art of fishing bait preservation techniques and products is that of a capability for successfully preserving for a long period of time, a wide variety of bait organisms such as worms, crickets, crawfish, grasshoppers, frogs, shrimp and other bait organisms, many of which are fragile and difficult to handle.

Accordingly, it is an object of this invention to provide a new and improved method of preserving fishing bait, which includes the steps of cleaning the fishing bait where such cleaning is necessary and pre-cooling the bait where such pre-cooling is desirable, and then freezing, sequentially condensing, evacuating and heating the bait organisms at specified temperatures and vacuum, and subsequently separating the fishing bait organisms where such separation is necessary, and packaging the bait.

Still another object of the invention is to provide a new and improved method for preserving fishing bait organisms which includes cleaning and pre-cooling the bait where such steps are necessary, as in the case of worms; reducing the temperature of the bait organisms to a pre-selected temperature which is below the eutectic for that organism; condensing water vapor around the organisms; evacuating the environment of the organisms for a specified period of time; heating the organisms to room temperature; separating the organisms; and packaging the organisms.

Still another object of this invention is to provide a new and improved method for preserving fishing worms which includes the steps of placing the fishing worms in a rotating screen to remove a quantity of bedding material adhering to the worms; removing additional bedding material from the worms by placing the worm mass in a stack or pile and allowing the bedding material to work to the top of the stack or pile as the worms move; pre-cooling trays for receiving the worms to a selected temperature; placing the worms in the trays and freezing the worms to a pre-selected temperature; condensing the water vapor; evacuating the environment containing the worms for a pre-selected period of time; heating the worms to room temperature; and placing the worms in a vibrating screen for separation, and packaging the worms.

A still further object of this invention is to provide a technique for preserving insects and other active organisms as fish bait, which includes the steps of pre-cooling the insects to reduce physical activity; freezing the insects to pre-selected temperature; condensing water vapor in the insect environment; evacuating the environment containing the insects to a preselected vacuum condition; heating the insects to room temperature; and packaging the insects.

SUMMARY OF THE INVENTION

These and other objects of the invention are provided in a new and improved process for preserving fishing bait organisms which includes the steps of cleaning and pre-cooling the organisms where such cleaning and pre-cooling is necessary, freezing the organisms to a pre-selected temperature which is below the eutectic temperature for the organisms, condensing vapor in the environment containing the organisms, evacuating the environment containing the organisms for a pre-selected period of time, heating the organisms to room temperature, and separating and packaging the organisms.

BRIEF DESCRIPTION OF THE DRAWING

The invention will be better understood by reference to the accompanying drawing, wherein:

FIG. 1 illustrates in diagram form, a method for preserving worms as fishing bait, which includes the steps of placing the worms in a rotating screen to initially separate bedding material; further separating the bedding material in a preferred second step; pre-cooling trays containing the worms in the third step; freezing the worms in a fourth step; condensing water vapor in the environment containing the worms in a fifth step; evacuating the environment containing the worms in a sixth step; heating the worms to room temperature in the seventh step; separating the worms by means of a vibrating screen in the eighth step; and packaging the worms in a ninth step.

DESCRIPTION OF THE PREFERRED EMBODIMENTS

Referring now to FIG. 1 of the drawing, in a preferred embodiment of the invention the method for preserving fishing bait is directed to a method of preserving fishing worms and includes an initial step of placing a quantity of the fishing worms directly from worm beds into a rotating screen which is approximately five to six feet long and is tilted with the entrance end positioned higher than the exit end. As the worms slowly tumble along the length of the screen, the bedding material drops from the screen and is collected for use in the worm bed. As the worms reach the exit end of the screen they are collected in a container and some bedding material is still on the worms. The worms are then placed on a flat surface, heaped or mounded and left alone, and the natural movement causes the bedding material to work to the top of the mound in a short time, where it is easily removed. In a most preferred embodiment of the invention the height of the rotating screen and the speed of rotation is adjusted such that the worms traverse the entire length of the screen in about 1 to 3 minutes, and the worms are left in the heaped or piled configuration to remove additional quantities of bedding material for about 5 to 10 minutes. After the last layer of bedding material is removed from the mass of worms, the worms are placed in pre-cooled, stainless steel trays in layers of about two inches thick. The trays are then placed in the refrigeration chamber of a freeze drying apparatus such as a Virtis [registered trademark] Consol Freezemobile, which is a product of the Virtis Co., Inc. of Gardiner New York, and the worms are rapidly cooled to a temperature of from about zero degrees to about minus 40 degrees centigrade at atmospheric pressure. In a most preferred embodiment of the invention the worms are subjected to a temperature of from about minus 35 to about minus 50 degrees, which is below the eutectic temperature for the worms. The eutectic temperature can be defined as a common freezing point for all of the worm components. The condensor cycle is then initiated and the temperature of the worms is lowered to a level in the range of about minus 40 degrees centigrade to about minus 100 degrees centigrade for about 15 to about 20 minutes. In a most preferred embodiment of the invention the temperature reached by the condensor is about minus 55 degrees centigrade and when this temperature is reached, a vacuum pump is started and air and other non-condensable vapors are removed from the refrigeration chamber containing the worms, in order to facilitate vapor migration from the worms. When about 100 microns of vacuum is reached, the refrigeration chamber is subjected to heat and the shelf temperature thermostat is set at plus twenty degrees centigrade. The worms are then left for about 36 hours until a temperature of 20 degrees centigrade is reached. When the processed worms reach a temperature of 20 degrees centigrade, the caked product is then removed from the apparatus and placed in the hopper of a vibrating screen to separate the individual worms from each other. The worms are packaged directly from the vibrating screen.

It will be appreciated by those skilled in the art that under circumstances where it is desired to preserve insects such as crickets, grasshoppers, and the like for fishing bait according to the method of this invention, an additional step is necessary to prepare the insects for insertion in the freeze drying apparatus. Accordingly, in a most preferred embodiment of the invention the insects are placed in a container and then in a refrigerator, in order to reduce physical activity. The cooled insects are then placed in pre-cooled stainless steel trays as in the case of the worms, and are then inserted in the freeze drying equipment. The procedure outlined above is then repeated in order to remove the water from the insects and the insects are subsequently removed from the apparatus and packaged directly without the necessity of utilizing the vibrating screen for separation. It should be noted that the pre-cooling step is necessary for such bait organisms as frogs and other active organisms in order to reduce physical activity prior to placement in the freeze drying apparatus.

Some examples of the present invention are as follows:

EXAMPLE I

About twelve pounds of earth worms known locally as the "red wiggler" variety, were introduced into a rotating screen and allowed to tumble the length of the screen to partially remove bedding material adhereing to the worms. The earth worms were collected at the lower end of the screen, placed in a mass on a flat surface and allowed to move at random in order to cause additional bedding materials to be forced to the top of the mass where it was periodically removed by hand. The cleaned earth worms were then placed in precooled, stainless steel trays and inserted in a Virtis Freezemobile freeze drying apparatus and the refrigeration system was switched to the "on" position. The shelf temperature was allowed to reach a temperature of minus 40 degrees centigrade, the condensor activated, and the refrigeration cycle terminated. Twenty minutes was allowed for the condensor temperature to reach minus 55 degrees centigrade and when this temperature was reached, the vacuum switch was moved to the "on" position. In about 15 minutes the vaccum was observed to reduce to about 100 microns and when that level of vacuum was reached, heat was introducted to the shelves. The vacuum release switch was then manipulated to break the vacuum, the vacuum pump turned off and the product allowed to slowly heat to room temperature, or about 20 degrees centigrade. The processed product was observed to be in the form of a "cake" of worms, and was removed from the machine and placed on a vibrating screen to separate the worms and facilitate packaging.

EXAMPLE II

Several thousand gray crickets were placed in a closed container and then placed in a refrigerator for about 8-10 hours to reduce the physical activity of the crickets. The crickets were then removed from the refrigerator, placed in pre-cooled stainless steel trays and subsequently placed in the Virtis freeze drying apparatus and the freezing, condensing, evacuating and heating procedure outlined in example I was repeated, in order to process the crickets. After reaching room temperature, the crickets were removed from the freeze drying apparatus and packaged directly.

It has surprisingly been found that one of the benefits of the freeze dried product of this invention is not only the well preserved nature of the product but also the tendency of the product to stay on a fishing hook better than it would have in the natural state. For example, it has been found that the preservation technique of this invention causes worms to toughen slightly, with little or no effect on the appearance and the odor characteristics of the worm. Accordingly, the worm will stay on the hook better and has therefore been found to be easier to use as a fish bait. It has further been found that the shelf life of the bait product preserved according to the method of this invention is virtually unlimited under circumstances where the product is well packaged and kept free of moisture. Accordingly, in another preferred embodiment of the invention the bait products of this invention are carefully packaged in sealed envelopes or containers which exclude moisture and insure a quality product for future use. Furthermore, as heretofore noted, when the processed bait product is contacted by water, it quickly absorbs the moisture and resumes natural color and odor characteristics for immediate use while fishing.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A method for preserving worms for fishing bait comprising the steps of:
    (a) introducing said worms into a rotating screen whereby bedding material is removed from said worms;
    (b) placing said worms in a heaped mass on a flat surface for about 5 to about 10 minutes to allow the natural movement of said worms to work bedding material to the top of the heap to complete the removal of the bedding material from said worms;
    (c) precooling said worms;
    (d) freezing said worms at a temperature at least as low as the eutectic temperature of said worms;
    (e) condensing water vapour surrounding said worms;
    (f) evacuating air and non-condensable vapors surrounding said worms; and
    (g) slowly heating said worms to a temperature of about 20 degrees centigrade.

2. A method for preserving worms for fishing bait comprising the steps of:
    (a) introducing said worms into a rotating screen whereby bedding material is removed from said worms;
    (b) placing said worms in a heaped mass on a flat surface for about 5 to about 10 minutes to allow the natural movement of said worms to work bedding material to the top of the heap to complete the removal of the bedding material from said worms;
    (c) precooling containers and placing said worms in said containers;
    (d) freezing said worms at a temperature at least as low as the eutectic freezing temperature of said worms;
    (e) condensing water vapor in the atmosphere surrounding said worms at a temperature of about minus 55 degrees centrigrade;
    (f) evacuating air and non-condensable vapors from the atmosphere surrounding said worms at a vacuum of about 100 microns; and
    (g) slowly heating said worms to a temperature of about 20 degrees centigrade.

3. The method according to claim 2 further comprising the step of introducing said worms into a vibrating screen after said heating, whereby said worms are separated for packaging.

* * * * *